United States Patent

[11] 3,619,677

| [72] | Inventor | William Hargreaves |
| --- | --- | --- |
| | | Jenkintown, Pa. |
| [21] | Appl. No. | 808,485 |
| [22] | Filed | Mar. 19, 1969 |
| [45] | Patented | Nov. 9, 1971 |
| [73] | Assignee | Singer-General Precision, Inc. |
| | | Little Falls, N.J. |

[54] TORQUER WITH MULTIPOLE PERMANENT MAGNET PRODUCED FROM A METAL RING
2 Claims, 7 Drawing Figs.

[52] U.S. Cl. .................................................. 310/154,
310/181, 310/239
[51] Int. Cl. ..................................................... H02k 21/26
[50] Field of Search........................................... 310/154,
155, 156, 254, 239, 241, 46, 256, 40, 248, 181,
179, 261, 265; 29/596

[56] References Cited
UNITED STATES PATENTS
| 2,008,493 | 7/1935 | Ehrlich.......................... | 310/254 |
| --- | --- | --- | --- |
| 2,048,161 | 7/1936 | Klaiber.......................... | 310/154 |
| 2,070,718 | 2/1937 | Ehrlich.......................... | 310/239 |
| 2,672,564 | 3/1954 | Krasno.......................... | 310/46 |
| 3,368,275 | 2/1968 | Eberline........................ | 310/154 |
| 3,488,836 | 1/1970 | Wheeler........................ | 310/154 |

Primary Examiner—D. X. Sliney
Assistant Examiner—R. Skudy
Attorneys—S. A. Giarratana, G. B. Oujevolk and S. M. Bender ABSTRACT: A torquer includes a cylindrical stator, a cylindrical rotor designed to rotate within the stator and a brush block ring assembly disposed over the rotor and alongside the stator, the stator is made by first magnetizing the stator with a magnetizing fixture so as to form poles in the stator solely by using the fixture. Usually four poles are so formed but more can also be formed. A ring-shaped keeper is mounted alongside the stator on the side opposite the brush block assembly side of the stator. The stator and the other components can then be shipped unassembled in this manner with the keeper alongside the stator. When assembled, the keeper is removed and the stator retains its magnetism.

PATENTED NOV 9 1971 3,619,677

INVENTOR.
WILLIAM HARGREAVES
BY
ATTORNEY

INVENTOR.
WILLIAM HARGREAVES
BY S. A. Giarratana
George B. Ungerath
ATTORNEY

TORQUER WITH MULTIPOLE PERMANENT MAGNET PRODUCED FROM A METAL RING

The present invention relates to torquers and more particularly to permanent magnet DC torquers.

A torquer is a small motor used in inertial navigation in connection with rotating components, e.g., gyros. Heretofore, torquers included multipole permanent magnet stators. Thus, a plurality of permanent magnets were imbedded into the stator. Each permanent magnet had to be isolated from the next, thereby creating a complex assembly. This type of torquer is expensive because of the necessity of holding close tolerance in order to fit mating parts. Also, complex assembly techniques are involved such as cementing and shrink fitting. To move from the blanks stage to finished part stage, additional machining operations are involved. Furthermore, such a torquer is weak because fragile parts are used for the outer and the magnet holder. The weakest link is the cement, and stresses and strains are introduced in many stages of the assembly and machining.

The present invention contemplates the manufacture of a torquer with a unitary permanent magnet stator. Thus, in the manufacture of a torquer which comprises a cylindrical stator, a cylindrical rotor designed to rotate within the stator and a brush block assembly disposed over the rotor and alongside the stator, the stator is made by first magnetizing the stator with a magnetizing fixture so as to form poles, usually four in the stator solely by using the fixture. A ring-shaped keeper is mounted alongside the stator on the side opposite the brush block assembly side of the stator. The stator and the other components can then be shipped unassembled in this manner with the keeper alongside the stator. When assembled, the keeper is removed and the stator retains its magnetism.

The invention as well as other objects and advantages will be more readily apparent from the following detailed description taken in connection with the accompanying drawings in which.

Figure 1:
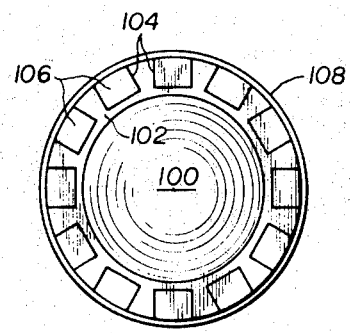
FIG. 1 shows a front view of a prior art magnet ring.

Shown in FIG. 1 is a permanent magnet torquer 100 of the prior art. This torquer had a magnet holder 102 with grooves 104 which contained usually 12 permanent magnets 106 cemented into the groove 104. These permanent magnets 106 were further retained in place by a nonmagnetic shrink-fitted retaining ring 108. This arrangement as heretofore pointed out was very difficult to manufacture and very unsatisfactory.

Figure 2:
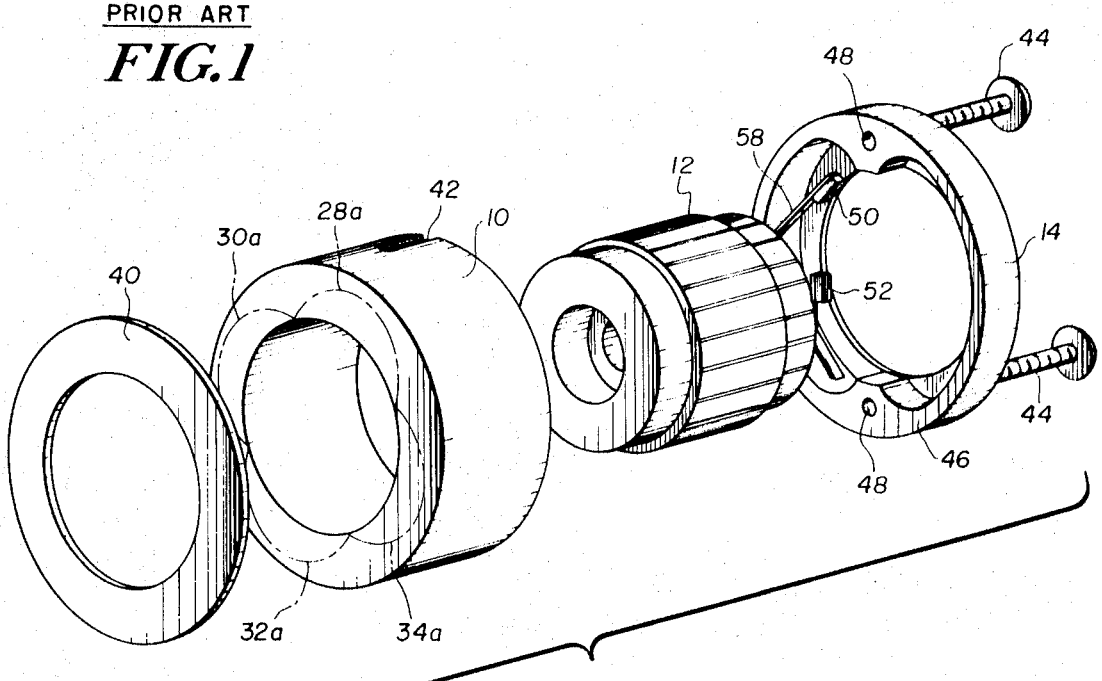
FIG. 2 illustrates a perspective exploded view of a torquer interior made according to the present inventive concept.

In FIG. 2 is shown the permanent magnet torquer contemplated herein. Essentially, the torquer comprises a cylindrical stator 10, a cylindrical rotor 12 designed to rotate with the stator 10 and a brush block ring assembly 14 disposed over the rotor alongside the stator.

Figure 3:
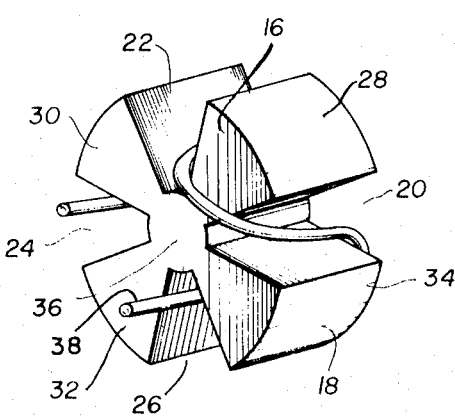
FIG. 3 illustrates a magnetizing fixture used with the torquer permanent stator of FIG. 2.
Figure 4:
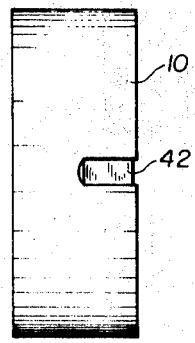
FIG. 4 is a front view of the permanent magnet stator according to the present inventive concept.
Figure 5:
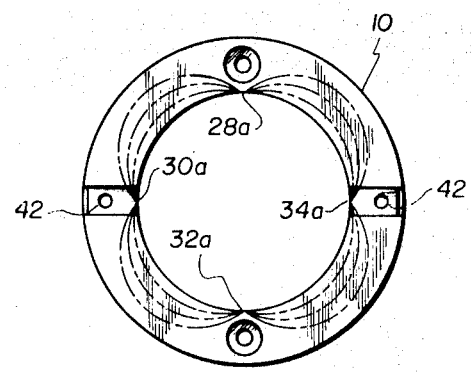
FIG. 5 is a side view of the stator shown in FIG. 4.
Figure 6:
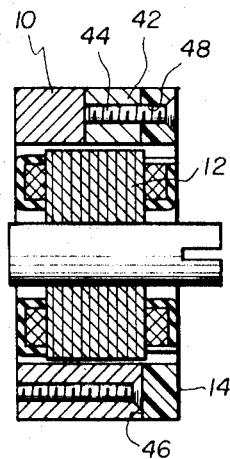
FIG. 6 illustrates a cross-sectional view of the rotor, stator and brush block assembly shown in the exploded view of FIG. 2, taken along lines 6—6 of FIG. 7; and, FIG. 7 shows an end view of the torquer interior highlighting the brush block assembly.
Figure 7:
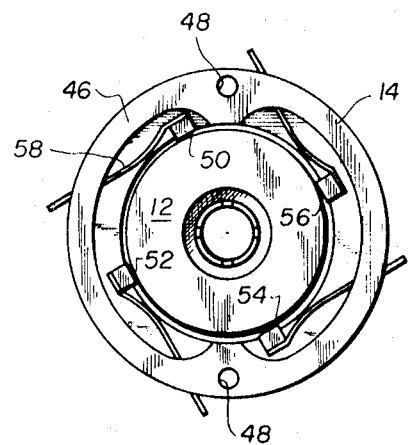

The cylindrical stator 10 is first magnetized by using a magnetizing fixture 16 shown in FIG. 1 3. Fixture 16 comprises a solid cylindrical metal base 18 which has been cut to form a cylindrical Maltese cross with cuts 20, 22, 24, 26. Thus, four poles 28, 30, 32, 34 are formed with a center hub 36. An electrical line 38 is passed through cuts 20, 22, 24, 26 in horseshoe fashion so as to create four poles N-S-N-S. The fixture 16 with proper windings is then inserted into the stator 10 and the stator is magnetized by passing a current through the windings, for a predetermined time period well known to those skilled in the art, depending on the material used. When the stator 10 has been magnetized, four poles 28a, 30a, 32a, 34a, will have been created extending between about 100° to about 120° around the stator inner periphery, corresponding to the four poles of the fixture. To maintain the magnetization in the stator 10, a keeper 40 made of magnetic material is placed on the back of the stator 10. The stator and keeper are shipped together. In addition to the stator and keeper, there is also the rotor 12 and the brush block 14.

The torquer is assembled when ready for installation by removing the keeper 40 and assembling the rotor and brush block to the stator. At the front end of the stator 10 are two holes 42 which will receive screws 44 which will pass through the brush block ring assembly 14. Brush block ring assembly 14 is an insulating material ring 46 with apertures 48 for the screws 44. Within the brush block insulating material ring 46 are four brushes 50, 52, 54, 56 designed to ride over the rotor 12. The brushes are each held by a resilient arm passing out through the insulating material ring 46.

The brushes will apply a torquing signal to the rotor 12 to cause the rotor to align itself with the stator poles.

It is to be observed therefore that the present invention provides for a method of manufacturing a torquer which has a cylindrical stator, a cylindrical rotor designed to rotate within the stator and a brush block ring assembly disposed over the rotor and alongside the stator. The method generally comprises first magnetizing the stator by inserting in the stator cylinder a magnetizing fixture with the desired number of poles, usually four, and passing a DC current through the fixture to magnetize the poles. A keeper is then placed on the stator until it is assembled over the rotor and next to the brush block assembly. Furthermore, the present invention provides for a torquer which comprises in combination, a ring-shaped brush block assembly with an inner circular wall and brushes internally held by resilient arms, a rotor within said brush block assembly, and a cylindrical homogeneous material, unitary, permanent stator around said rotor, said stator having four or move defined magnetic poles therein.

I claim:

1. In a torquer having a brush block assembly of ring-shaped configuration with brushes within said assembly, a rotor having an axis disposed for rotation within said assembly coaxially therewith and contacted by said brushes and a stator of cylindrical configuration having an internal bore coaxially receiving said rotor, the improvement therein wherein said stator is a one-piece unitary homogeneous magnet structure with at least four angularly spaced portions forming at least four permanent magnet poles equidistant from each other, and wherein said stator is removable from said rotor and said brush block assembly, and wherein said stator bore is arranged to receive a magnetizing fixture, when said fixture, when said stator is removed from said rotor and said brush block assembly, said magnetizing fixture having a plurality of poles, said fixture poles corresponding in number and location to said stator poles, and wherein said stator has an axially outer bearing surface, said bearing surface being arranged to engage and support a keeper member, when said stator is removed from said rotor and said brush block assembly, said keeper member having an end face frictionally engaging said stator surface, said keeper member being composed of a magnetic material, said keeper end face being arranged to apply a bearing pressure on said stator surface.

2. The torquer claimed in claim 1 including fastening means holding said stator to said brush block assembly, and wherein said magnetizing fixture includes a one-piece metal base and a winding assembly, said metal base having a center hub with four radial arms shaped in the form of a cylindrical Maltese cross, and wherein said brush block assembly includes a one-piece ring member and a plurality of brushes, said ring member being composed of an insulating material, said brushes being disposed radially outwardly of said rotor, said one-piece ring being disposed radially outwardly of said brushes and being removably connected to said stator by said fastening means.

* * * * *

PO-1050
(5/69)

UNITED STATES PATENT OFFICE
CERTIFICATE OF CORRECTION

Patent No. 3,619,677                          Dated      11/19/71

Inventor(s)  USSN 808,485      WILLIAM HARGREAVES

It is certified that error appears in the above-identified patent and that said Letters Patent are hereby corrected as shown below:

PLEASE CHANGE THE NAME OF THE ASSIGNEE FROM:

Singer-General Precision, Inc.

TO

THE SINGER COMPANY

Signed and sealed this 2nd day of May 1972.

(SEAL)
Attest:

EDWARD M. FLETCHER, JR.            ROBERT GOTTSCHALK
Attesting Officer                    Commissioner of Patents